US012630720B2

(12) United States Patent
Chen et al.

(10) Patent No.: US 12,630,720 B2
(45) Date of Patent: May 19, 2026

(54) METHOD FOR MANUFACTURING BIOCHAR, BIOCHAR AND COMPOSITE MATERIAL

(71) Applicant: National Cheng Kung University, Tainan City (TW)

(72) Inventors: Wei-Hsin Chen, Kaohsiung City (TW); Kuan-Ting Lee, Tainan City (TW)

(73) Assignee: National Cheng Kung University, Tainan City (TW)

( * ) Notice: Subject to any disclaimer, the term of this patent is extended or adjusted under 35 U.S.C. 154(b) by 562 days.

(21) Appl. No.: 18/118,712

(22) Filed: Mar. 7, 2023

(65) Prior Publication Data

US 2024/0124715 A1 Apr. 18, 2024

(30) Foreign Application Priority Data

Oct. 18, 2022 (TW) .................................. 111139407

(51) Int. Cl.
| | |
|---|---|
| *C09C 1/44* | (2006.01) |
| *C04B 14/02* | (2006.01) |
| *C08K 3/04* | (2006.01) |
| *C09D 7/61* | (2018.01) |
| *C10B 53/02* | (2006.01) |
| *C10B 57/06* | (2006.01) |
| *C10B 57/14* | (2006.01) |

(52) U.S. Cl.
CPC .............. *C09C 1/44* (2013.01); *C04B 14/022* (2013.01); *C08K 3/04* (2013.01); *C09D 7/61* (2018.01); *C10B 53/02* (2013.01); *C10B 57/06* (2013.01); *C10B 57/14* (2013.01)

(58) Field of Classification Search
None
See application file for complete search history.

(56) References Cited

U.S. PATENT DOCUMENTS

| | | | | |
|---|---|---|---|---|
| 2011/0117619 A1* | 5/2011 | Hansen | .................... | C10G 1/00 |
| | | | | 435/166 |
| 2017/0233658 A1* | 8/2017 | Shu | ......................... | C10B 57/18 |
| | | | | 44/606 |
| 2021/0155995 A1* | 5/2021 | Bartek | ................... | C13K 13/00 |

FOREIGN PATENT DOCUMENTS

| | | | | |
|---|---|---|---|---|
| CN | 113277492 A | 8/2021 | | |
| TW | 202212257 A | 4/2022 | | |
| WO | WO-2011061400 A1 * | 5/2011 | ............... | C12P 7/10 |

OTHER PUBLICATIONS

Federico Verdini, Emanuela Calcio Gaudino, Giorgio Grillo, Silvia Tabasso and Giancarlo Cravotto, Cellulose Recovery from Agri-Food Residues by Effective Cavitational Treatments, Applied Sciences, MDPI, 2021, 11 (10), 4693. Published: May 20, 2021, p. 1~36, May 20, 2021.

* cited by examiner

*Primary Examiner* — Stefanie J Cohen

(74) *Attorney, Agent, or Firm* — Winston Hsu

(57) ABSTRACT

A biomass treatment method includes steps as follows. A biomass and sodium percarbonate are provided, wherein the biomass includes hemicellulose, cellulose and/or lignin. The biomass and the sodium percarbonate are mixed.

4 Claims, 10 Drawing Sheets
(5 of 10 Drawing Sheet(s) Filed in Color)

Example 2

Comparative Example 1

Comparative Example 2                    Example 4

Comparative
Example 3

Comparative
Example 4

Comparative
Example 1

Example 5

Example 6

Example 7

Example 8          Example 5          Example 9

Example 10          Example 6          Example 11

Example 12          Example 7          Example 13

Example 18

Comparative Example 5

EVA Substrate

METHOD FOR MANUFACTURING BIOCHAR, BIOCHAR AND COMPOSITE MATERIAL

BACKGROUND OF THE INVENTION

1. Field of the Invention

The present disclosure relates to a biomass treatment method, a biochar and a composite material, and more particularly, to a biomass treatment method capable of reducing a probability of mold growth and treatment cost, and a biochar and a composite material manufactured by the biomass treatment method.

2. Description of the Prior Art

A biomass refers to an organic substance that comes from mass of living organisms. The common biomass includes wood and forestry wastes (such as wood dust), crops and agricultural wastes (such as soybeans, corns, rice and bagasse). The biomass has gradually drawn attention due to its wide application. For example, the biomass can be used as a biomass fuel and can be one of the alternative energies. The biomass can also be used as a raw material of an industrial product. However, a moisture content the biomass is usually high, which is easy to grow mold and is not easy to store. For improving a storage performance of the biomass, hot air drying is commonly used to remove the moisture in the biomass, so as to reduce the probability of mold growth. However, when adopting the aforementioned method, it leads to energy consumption, which is not beneficial to the environmental protection appeal of energy saving and carbon reduction, and increases the treatment cost of the biomass.

SUMMARY OF THE INVENTION

According to one embodiment of the present disclosure, a biomass treatment method includes steps as follows. A biomass and sodium percarbonate are provided, wherein the biomass includes hemicellulose, cellulose and/or lignin. The biomass and the sodium percarbonate are mixed.

According to another embodiment of the present disclosure, a biochar manufactured by the aforementioned biomass treatment method and further with a step of torrefying the biomass and the sodium percarbonate to convert the biomass into the biochar, wherein the biochar has hygroscopicity.

According to yet another embodiment of the present disclosure, a composite material includes the aforementioned biochar and a substrate. The biochar is dispersed in the substrate.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The patent or application file contains at least one drawing executed in color. Copies of this patent or patent application publication with color drawing (s) will be provided by the Office upon request and payment of the necessary fee. The present disclosure can be more fully understood by reading the following detailed description of the embodiment, with reference made to the accompanying drawings as follows.

DETAILED DESCRIPTION

<Biomass Treatment Method>

Figure 1:
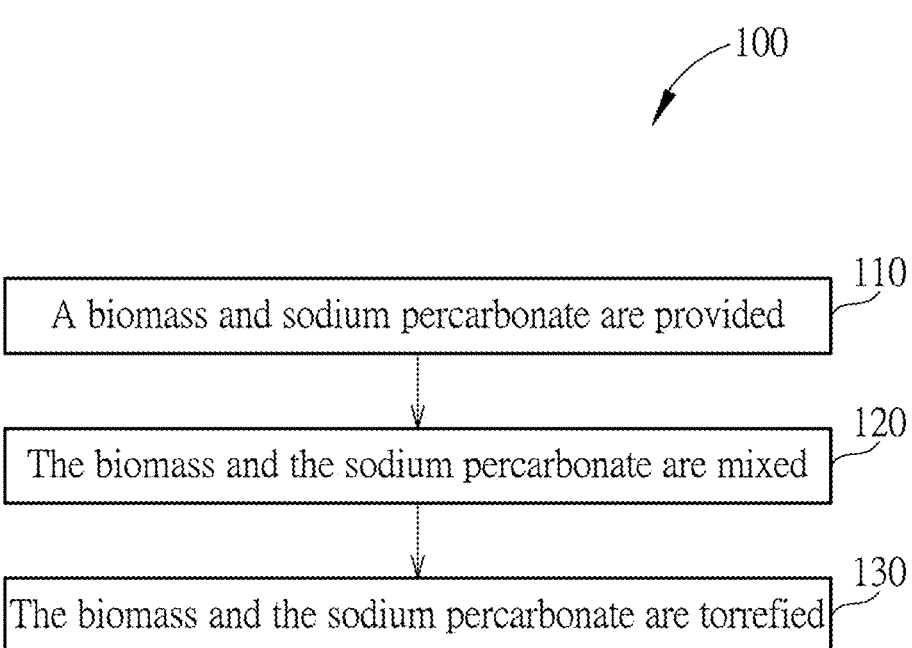
FIG. 1 is a flow diagram showing a biomass treatment method according to one embodiment of the present disclosure.

Please refer to FIG. 1, which is a flow diagram showing a biomass treatment method 100 according to one embodiment of the present disclosure. The biomass treatment method 100 includes Step 110 and Step 120, and can selectively include Step 130. In Step 110, a biomass and sodium percarbonate are provided, wherein the biomass includes hemicellulose, cellulose and/or lignin. Specifically, the biomass can be agricultural and forest crops. The agricultural and forestry crops can be, but are not limited to, coffee beans, corn stalks, sugarcane, water chestnut, rice, coconut and wood. The biomass can also be wastes, such as agricultural wastes or forestry wastes. The agricultural wastes can be, but are not limited to, coffee grounds, bagasse, rice husks, rice straw, tree stubs and palm husks. The forestry wastes can be, but are not limited to, wood scraps and sapwood of wood factories or furniture factories and waste wood generated from pruning of timber trees or street trees. The biomass can be pretreated. For example, the particle size of the biomass can be controlled by grinding and sieving, so as to facilitate subsequent treatment or application. According to one embodiment of the present disclosure, the particle size of the biomass can be greater than 0 mm and less than or equal to 10 mm. Alternatively, the particle size of the biomass can be greater than 0 mm and less than or equal to 5 mm. The aforementioned particle sizes of the biomass are exemplary and can be adjusted according to the type of biomass and the subsequent treatment or application.

In Step 120, the biomass and the sodium percarbonate are mixed. Therefore, the probability of mold growth on the biomass can be reduced significantly, which is beneficial to improve the storage performance of the biomass. Compared with the conventional method of hot air drying, the present disclosure can save the energy required by the hot air drying, which is beneficial to reduce the treatment cost. According to one embodiment of the present disclosure, based on 100 parts by weight of the biomass and the sodium percarbonate, a content of the sodium percarbonate can be 2 parts by weight to 90 parts by weight.

In Step 130, the biomass and the sodium percarbonate are torrefied to convert the biomass into a biochar. According to one embodiment of the present disclosure, the biomass and the sodium percarbonate can be torrefied at 200° C. to 300° C. for 30 minutes to 90 minutes in an oxygen-limited environment. The oxygen-limited environment refers an environment in which a concentration of oxygen is less than 5 vol %. As such, the biomass can be prevented from burning during the process of torrefaction. The oxygen-limited environment can be formed by introducing an inert gas with a flow rate of 10 cc/min to 200 cc/min. The inert gas can be nitrogen or argon. According to the present disclosure, the inert gas refers to a gas that does not react with the biomass and the sodium percarbonate. When the flow rate is less than 10 cc/min, the removal rate of volatile products may be reduced. When the flow rate is greater than 200 cc/min, the removal rate of volatile products may be accelerated. When the torrefaction temperature is lower than 200° C., it may lead to incomplete carbonization. When the torrefaction temperature is greater than 300° C., the yield of the biochar may be decreased. When the torrefaction time is less than 30 minutes, it may lead to incomplete reaction. When the torrefaction time is greater than 90 minutes, it may waste energy due to keep heating after the reaction is completed.

The sodium percarbonate tends to decompose into sodium carbonate and hydrogen peroxide, as shown in Formula (1) below. Hydrogen peroxide can undergo the reactions of Formula (2) to Formula (5)·$Na_2CO_3 \cdot 1.5H_2O_{2(s)} \rightarrow Na_2CO_{3(s)} + 1.5H_2O_{2(1)}$ (1); $H_2O_2 \rightarrow 2OH \cdot$ (2); $HO \cdot + H_2O_2 \rightarrow + HO_2 \cdot + H_2O$ (3); $HO_2 \cdot + H_2O_2 \rightarrow HO \cdot + H_2O + O_2$ (4); $HO_2 \cdot + HO_2 \longrightarrow HO \cdot + HO^- + O_2$ (5).

When the sodium percarbonate is mixed with the biomass, the hydrogen peroxide generated by the self-decomposition of the sodium percarbonate or the dissolve dissolution of the sodium percarbonate in water can generate plenty of free radicals through the reactions shown in Formula (2) to Formula (5), such that the biomass can be oxidized to weaken the intermolecular strength thereof, which is beneficial to enhance the carbonization degree of the biochar in the torrefaction process. Moreover, during the torrefaction process, gases, such as $CO_2$, $O_2$ and $H_2O$, generated from the sodium percarbonate are beneficial for the formation of pore structures in the biochar, such that the hygroscopicity of the biochar can be enhanced. In practical application, after obtaining the biomass from the production place, the biomass can be mixed with the sodium percarbonate, and then the mixture of the biomass and the sodium percarbonate is transported to the site where the torrefaction apparatus is located and can be torrefied directly with the torrefaction apparatus (i.e., the mixture of the biomass and the sodium percarbonate can be torrefied directly). Therefore, the probability of mold growth on the biomass can be reduced, and the transport time can be well used to oxidize the biomass. Moreover, there is no need to separate the sodium percarbonate from the biomass before the torrefaction. The sodium percarbonate can directly participate in the torrefaction to improve the properties of the biochar. Compared with the conventional method, the method according to the present disclosure has a simplified process and can greatly reduce the cost of time and energy. Moreover, the biochars manufactured by the conventional method are not hygroscopic. Carbon materials which are hygroscopic, such as activated carbons, require high temperature thermal treatment (at least 700° C.) for manufacturing the carbon materials. In the present disclosure, by adding the sodium percarbonate during the torrefaction process, the biochar can be featured with excellent hygroscopicity with a lower torrefaction temperature (200° C. to 300° C.). Compared with the manufacturing method of other hygroscopic carbon materials, such as the activated carbons, the present disclosure is beneficial to save energy. In addition, when the biomass is required to be converted into the biochar for subsequent application, Step 130 is required. In the case that the biomass is not required to be converted into the biochar, Steps 110 and 120 alone can improve the storage performance of the biomass.

<Biochar>

According to the present disclosure, a biochar manufactured by the aforementioned biomass treatment method 100 is provided. The biochar has hygroscopicity. Therefore, the subsequent applications of the biochar can be broadened. For example, the biochar can be mixed with different substrates to manufacture different composite materials. According to the present disclosure, a specific surface area of the biochar can be greater than 0 $m^2/g$ and less than or equal to 200 $m^2/g$. Based on 100 parts by weight of the biochar, a content of carbon in the biochar can be 60 parts by weight to 80 parts by weight, and a content of ash in the biochar can be less than or equal to 2 parts by weight. The biochar can have a pH of 7. The activated carbon is an example of other hygroscopic carbon materials. The activated carbon has properties as the follows: a specific surface area of the activated carbon can be 900 $m^2/g$ to 1200 $m^2/g$; based on 100 parts by weight of the activated carbon, a content of carbon in the activated carbon can be greater than 90 parts by weight, and a content of ash in the activated carbon can be less than or equal to 5 parts by weight. The activated carbon can have a pH of 9 to 11. In other words, the properties and the composition of the biochar according to the present disclosure are different from that of the activated carbon.

<Composite Material>

According to the present disclosure, a composite material includes the aforementioned biochar and a substrate is provided, wherein the biochar is dispersed in the substrate. According to one embodiment of the present disclosure, the substrate can include a polymer material. The composite material can be, but is not limited to, a plastic material or a polymer coating. According to another embodiment of the present disclosure, the substrate can include building materials, such as cement and plaster, and the composite material can be, but is not limited to, a building stone material or mud-like coating. In other words, when the composite material of the present disclosure is a coating, the coating can be a polymer coating or a mud-like coating depending on the type of the substrate. According to one embodiment of the present disclosure, based on 100 parts by weight of the composite material, a content of the biochar can be 0.5 parts by weight to 50 parts by weight. However, the present disclosure is not limited thereto, and the content of the biochar in the composite material can be flexibly adjusted according to practical demands. For example, when the composite material is a coating, and the biochar is used as the pigment therein, the content of the biochar can be adjusted flexibly according to the required color shade.

Specifically, the composite material can be the plastic material. In this case, the substrate can include a thermoplastic material or a thermoset material. For example, the thermoplastic material can be polyethylene, polystyrene, polyvinyl chloride, ethylene vinyl acetate copolymer (EVA)

and thermoplastic polyurethane (TPU), and the thermoset material can be epoxy resin. When manufacturing the kind of composite materials, the biochar can be blended into the thermoplastic material or the thermoset material. Other additives, such as dispersants and chemical auxiliaries, can be optionally added. Then the granulation process is performed to obtain plastic masterbatches. The masterbatches can be processed to obtain the plastic material. The composite material according to the present disclosure can be the intermediate product, i.e., the plastic masterbatches or the finished product, i.e., the plastic material, wherein the biochar is dispersed in the thermoplastic material or the thermoset material. By adding the biochar, the composite material can be colored by the biochar. That is, the biochar can replace the conventional pigments. When the additional amount of the biochar is appropriate, it is beneficial to improve the mechanical strength of the composite material. Furthermore, by adding the biochar, the usage amount of the thermoplastic material or the thermoset material can be reduced, which is beneficial to reduce the carbon emissions. Furthermore, the main component of the biochar is carbon, it is also beneficial for carbon capture and storage, and thus can meet the current environmental appeals for reducing carbon emissions. When the composite material is the plastic material, based on 100 parts by weight of the composite material, the content of the biochar can be 0.5 parts by weight to 50 parts by weight. Therefore, is beneficial for improving the mechanical properties such as tensile stress of the composite material. Moreover, the composite material unable to be molded due to excessive high content of the biochar can be prevented.

For another example, the composite material may be a polymer coating. The polymer coating may include paint, but the present disclosure is not limited thereto. It is known that the components of the polymer coating include film-forming substances, pigments, solvents, additives etc. The film-forming substance is used to bind other components in the polymer coating to form a coating film, and the film-forming substances can be a natural resin or a synthetic resin, such as an alkyd resin, an acrylic resin, a chlorinated rubber resin, an epoxy resin, etc. The pigment is used to color the coating film. The solvent is used to dissolve or disperse the film-forming substance into a uniform liquid state. The additives are used to improve the performance of the polymer coating or the coating film.

The biochar according to the present disclosure can be used as a pigment. In this case, the substrate can be the components other than the pigment in the polymer coating. By replacing the conventional pigment with the biochar, the cost can be reduced. The main component of the biochar is carbon, it is also beneficial for carbon capture and storage, and thus can meet the current environmental appeals for reducing carbon emissions.

<Preparation and Property of Examples>

Take an appropriate amount of coffee grounds, and add different amounts of sodium percarbonate to the same amount of coffee grounds. Observe the state of mold growth under normal temperature (the temperature is 25° C. to 30° C.) and normal pressure every 7 days, and the observation is continued for 56 days. The day that the mold is observed is recorded. If no mold is observed on the 56th day, the "–" is recorded, and the results are shown in Table 1.

TABLE 1

| | Addition amount of sodium percarbonate | | | | |
|---|---|---|---|---|---|
| | 0 wt % | 2 wt % | 3 wt % | 4 wt % | 5 wt % |
| The day that the mold is observed | the 7th day | the 14th day | the 14th day | the 14th day | the 35th day |
| | Addition amount of sodium percarbonate | | | | |
| | 7 wt % | 10 wt % | 30 wt % | 50 wt % | 70 wt % |
| The day that the mold is observed | — | — | — | — | — |

In Table 1 and the below description, the content/addition amount of sodium percarbonate refers to the percentage of the sodium percarbonate in the total weight of the mixture formed by the biomass and the sodium percarbonate, i.e., the weight percentage (wt %) of the sodium percarbonate in the mixture formed by the biomass and the sodium percarbonate. For example, "2 wt %" refers that based on 100 parts by weight of the total weight of the biomass and the sodium percarbonate, the content of the sodium percarbonate is 2 parts by weight, and the content of the biomass is 98 parts by weight. As shown in Table 1, when the coffee grounds are not added with the sodium percarbonate, the mold can be observed on the 7th day. When the coffee grounds are added with a small amount of the sodium percarbonate (such as 2 wt % to 5 wt %), the mold growth can be postponed. When the content of sodium percarbonate is equal to or greater than 7 wt %, the mold is not observed on the 56th day. It shows that the biomass treatment method according to the present disclosure can significantly reduce the probability of the mold growth on the biomass, and it is beneficial to improve the storage performance of the biomass.

Moreover, the moisture content of the coffee grounds before and after adding the sodium percarbonate are measured, and the results are shown in Table 2.

TABLE 2

| | Before adding the sodium percarbonate | 7 days after adding 50 wt % of sodium percarbonate | 30 days after adding 50 wt % of sodium percarbonate |
|---|---|---|---|
| Moisture content | 68 wt % | 29 wt % | 29 wt % |

As shown in Table 2, by adding the sodium percarbonate, it is beneficial to reduce the moisture content of the coffee grounds. Therefore, it is beneficial to inhibit the mold growth.

Take an appropriate amount of coffee grounds, and place the coffee grounds into a tubular high-temperature furnace to conduct torrefaction. The torrefaction is conducted under nitrogen atmosphere (99.99%) with a flow rate of nitrogen being 100 cc/min, and the torrefaction is conducted at 300° C. for 1 hour, wherein the solid product is the biochar of Comparative Example 1. Mix 30 wt %, 50 wt % and 70 wt % of sodium percarbonate with coffee grounds respectively to conduct torrefaction, and the conditions of the torrefaction are identical to that of Comparative Example 1, wherein the solid products are the biochars of Examples 1-3, respectively. The biochars of Comparative Example 1 and Examples 1 to 3 are observed with a high-resolution SEM (HITACHI SU-5000). The results are shown in FIG. 2, and the pore sizes of the biochars are measured and recorded in Table 3.

TABLE 3

|  | Comparative Example 1 | Example 1 | Example 2 | Example 3 |
|---|---|---|---|---|
| Addition amount of sodium percarbonate | 0 wt % | 30 wt % | 50 wt % | 70 wt % |
| Pore size | none | <50 nm | 50-100 nm | 100 nm |

Figure 2:
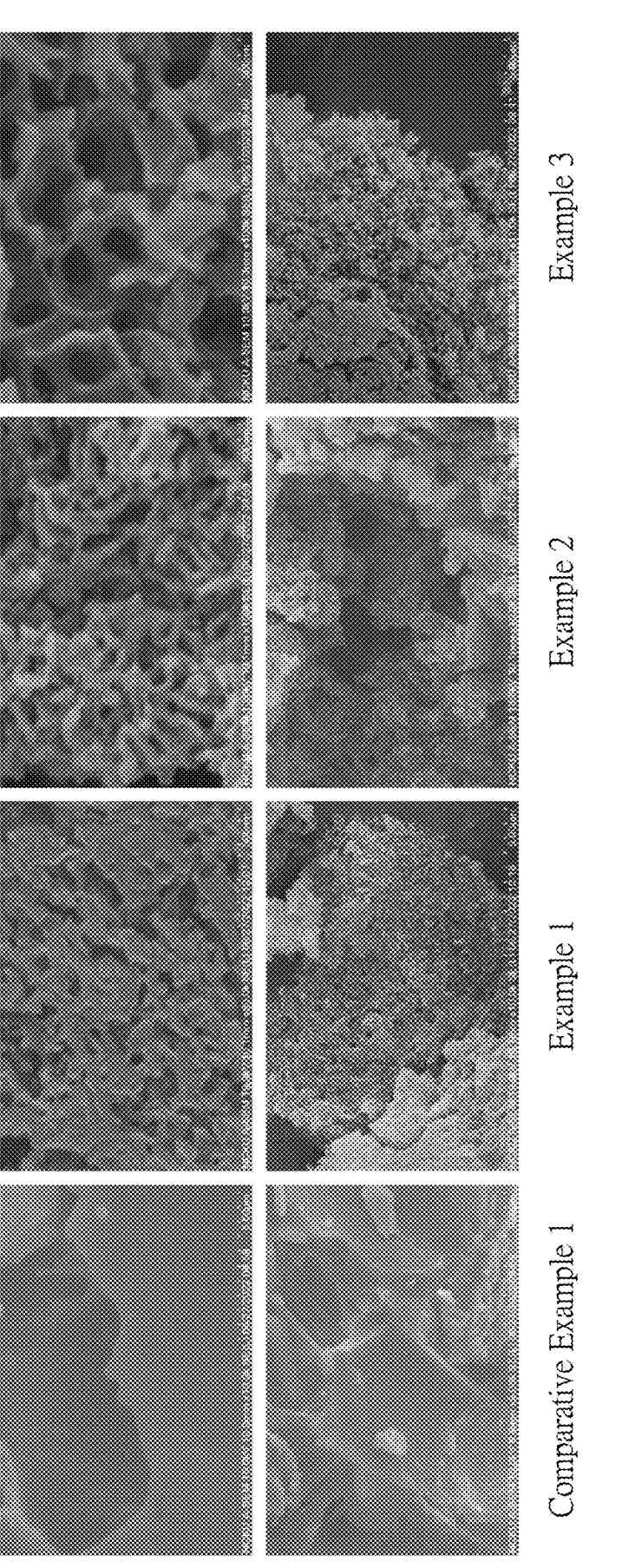
FIG. 2 shows scanning electron microscope (SEM) images of biochars of Comparative Example 1 and Examples 1 to 3.

Please refer to FIG. 2, which shows SEM images of the biochars of Comparative Example 1 and Examples 1 to 3, wherein the images of the upper row are partial enlarged view of the images of the lower row, respectively. As shown in FIG. 2 and Table 3, when the coffee grounds are not mixed with the sodium percarbonate, the biochar generated thereby has a dense structure and no pores are observed. When the coffee grounds are mixed with the sodium percarbonate, the biochar can be formed with pores. When the addition amount of the sodium percarbonate is higher, the pore size is larger. In other words, according to the present disclosure, the pore size can be controlled by adjusting the addition amount of the sodium percarbonate.

Figure 3:
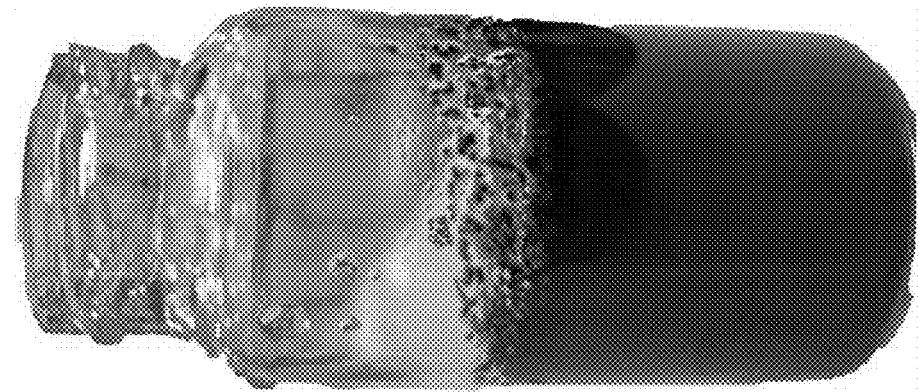
FIG. 3 shows results of mixing biochars of Comparative Example 1 and Example 2 with water.
Figure 3:
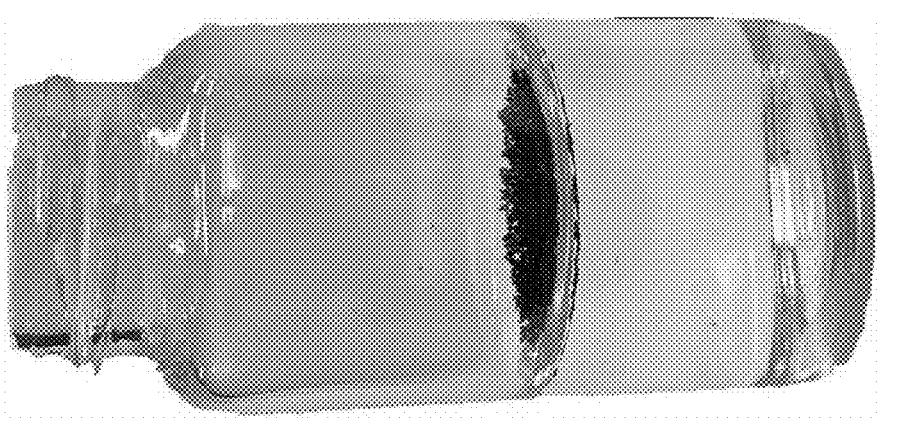

The biochars of Comparative Example 1 and Example 2 and water are put into two glass jars, respectively. The glass jars are shaken for twice after being sealed, then the mixing state of the biochars and the water are observed and recorded by photos. Please refer to FIG. 3, which shows results of mixing the biochars of Comparative Example 1 and Example 2 with water. As shown in FIG. 3, the biochar of Comparative Example 1 is not hygroscopic and is suspended on the water surface. On the contrary, the biochar of Example 2 has hygroscopicity and can be dispersed in water.

Take an appropriate amount of tea residue, wherein the tea residue is the residue of tea leaves that are brewed. The tea residue is drained and does not need other pretreatments, such as drying or cutting. The tea residue is placed into a tubular high-temperature furnace to conduct torrefaction. The torrefaction is conducted under nitrogen atmosphere (99.99%) with a flow rate of nitrogen being 100 cc/min, and is conducted at 300° C. for 1 hour, wherein the solid product is the biochar of Comparative Example 2. Mix 10 wt % of sodium percarbonate with tea residue to conduct torrefaction, and the conditions of the torrefaction are identical to that of Comparative Example 2, wherein the solid product is the biochar of Example 4. The biochars of Comparative Example 2 and Example 4 are observed with the high-resolution SEM (HITACHI SU-5000)

Figure 4:
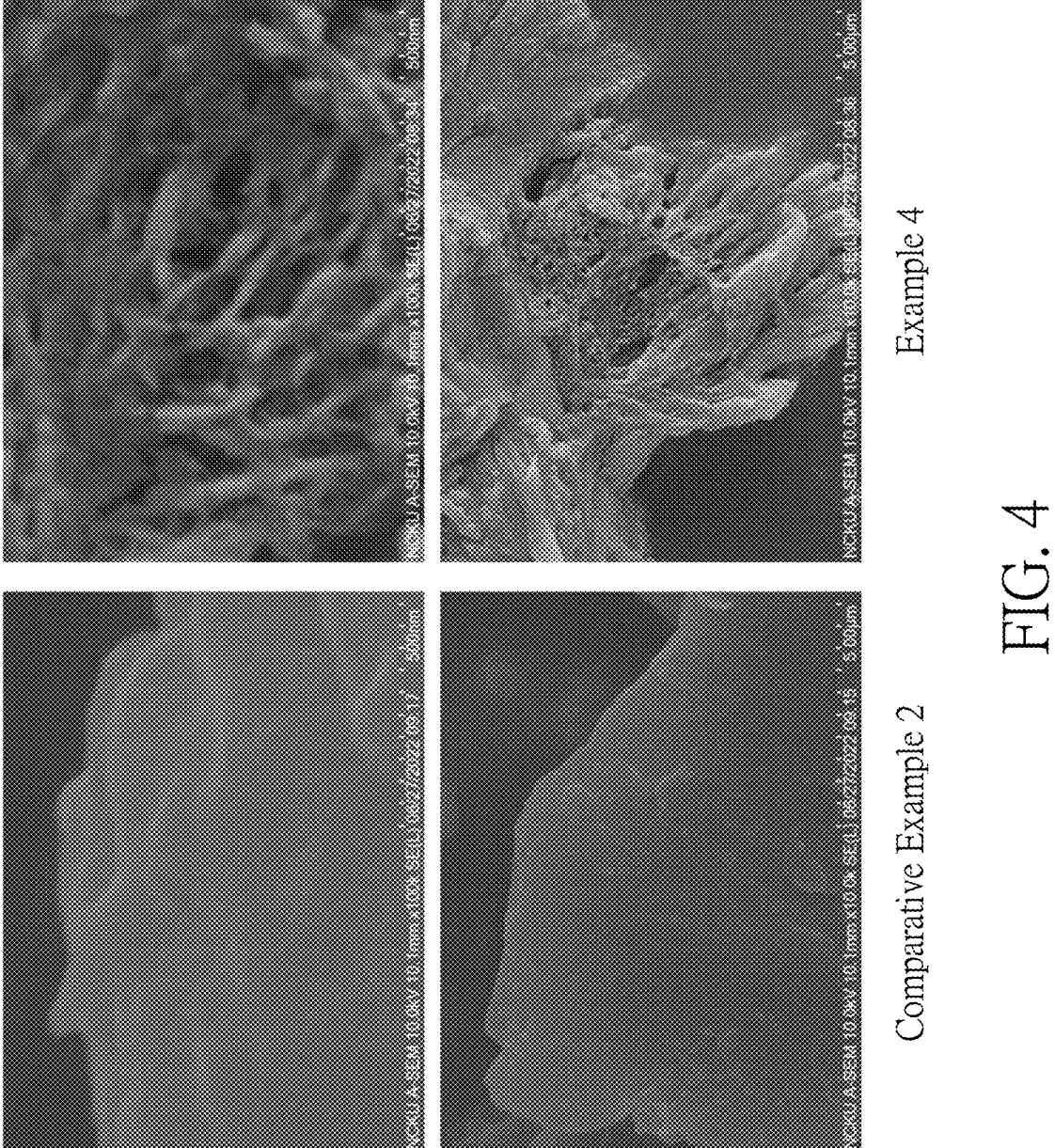
FIG. 4 shows SEM images of biochars of Comparative Example 2 and Example 4.

Please refer to FIG. 4, which shows SEM images of the biochars of Comparative Example 2 and Example 4, wherein the images of the upper row are partial enlarged view of the images of the lower row, respectively. As shown in FIG. 4, when the tea residue is not mixed with the sodium percarbonate, the biochar has a dense structure and no pores are observed. When the tea residue is mixed with the 10 wt % of sodium percarbonate, the biochar can be formed with pores, and the pore size is less than 50 nm.

As shown in Table 4, the torrefaction temperature of Comparative example 1 is changed, and other conditions of the torrefaction are remained, biochars of Comparative examples 3 and 4 can be obtained. Moreover, the kind of the biomass, the content of the sodium percarbonate, the torrefaction temperature and the torrefaction time of Example 1 are changed, and other conditions of the torrefaction are remained, biochars of Examples 5 to 17 can be obtained, wherein when the biomass is water chestnut shell, palm shell or tree trunk, the biomass can be subject to a cut process prior to the torrefaction, such that a particle size of the biomass can be less than or equal to 5 mm.

TABLE 4

|  | Biomass | Content of sodium percarbonate (wt %) | Torrefaction temperature (° C.) | Torrefaction time (min(s)) |
|---|---|---|---|---|
| Example |  |  |  |  |
| 1 | coffee grounds | 30 | 300 | 60 |
| 2 | coffee grounds | 50 | 300 | 60 |
| 3 | coffee grounds | 70 | 300 | 60 |
| 4 | tea residue | 10 | 300 | 60 |
| 5 | coffee grounds | 10 | 200 | 60 |
| 6 | coffee grounds | 10 | 250 | 60 |
| 7 | coffee grounds | 10 | 300 | 60 |
| 8 | coffee grounds | 10 | 200 | 30 |
| 9 | coffee grounds | 10 | 200 | 90 |
| 10 | coffee grounds | 10 | 250 | 30 |
| 11 | coffee grounds | 10 | 250 | 90 |
| 12 | coffee grounds | 10 | 300 | 30 |
| 13 | coffee grounds | 10 | 300 | 90 |
| 14 | coffee grounds | 15 | 300 | 60 |
| 15 | water chestnut shell | 10 | 300 | 60 |
| 16 | palm shell | 10 | 300 | 60 |
| 17 | tree trunk | 10 | 300 | 60 |
| Comparative Example |  |  |  |  |
| 1 | coffee grounds | 0 | 300 | 60 |
| 2 | tea residue | 0 | 300 | 60 |
| 3 | coffee grounds | 0 | 200 | 60 |
| 4 | coffee grounds | 0 | 250 | 60 |

Figure 5:
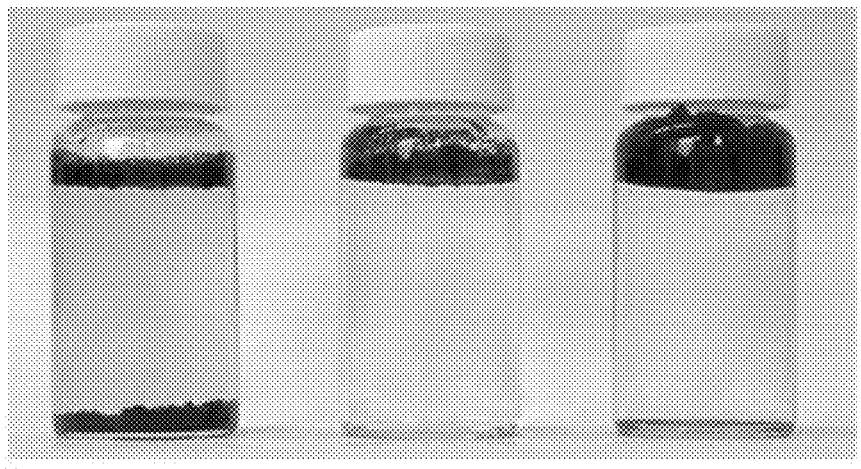
FIG. 5 shows results of mixing biochars of Comparative Examples 1, 3, 4 and Examples 5, 6, 7 with water.
Figure 5:
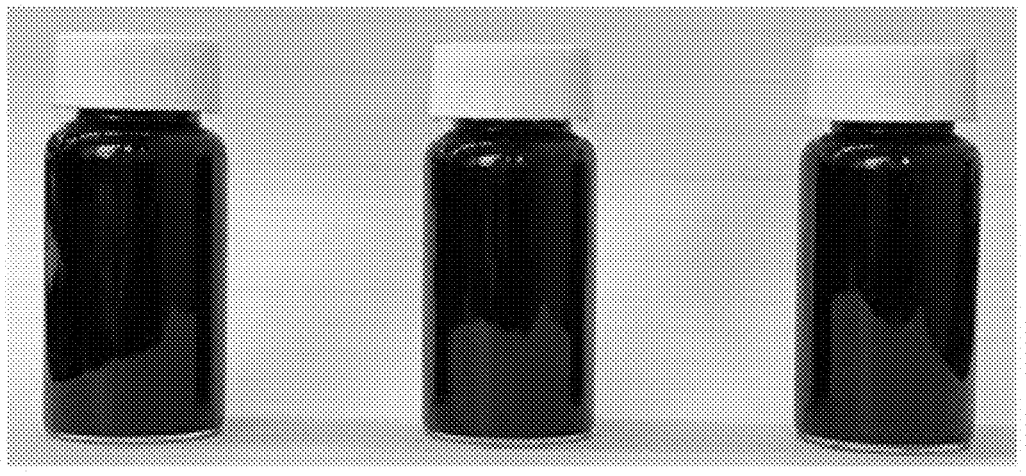
Figure 6:
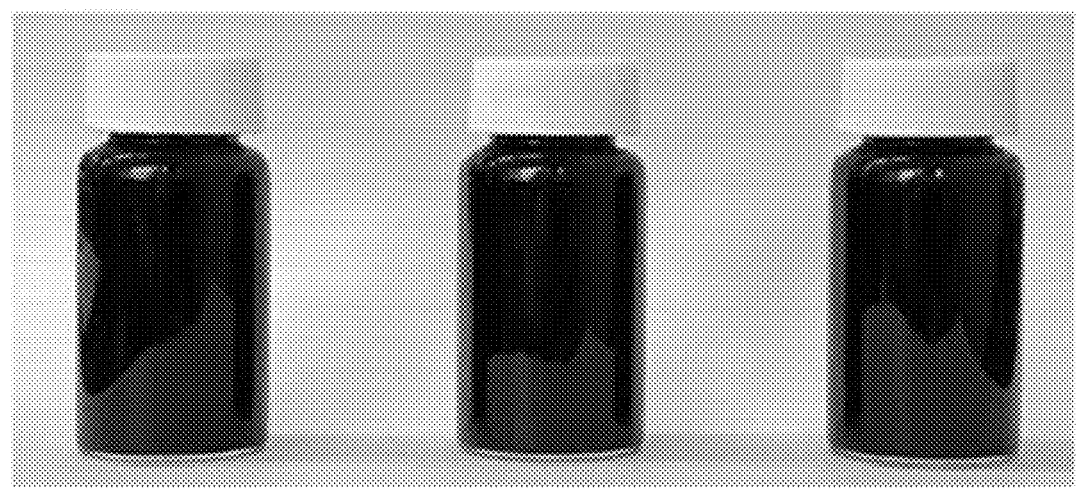
FIG. 6 shows results of mixing biochars of Examples 5 to 13 with water.
Figure 6:
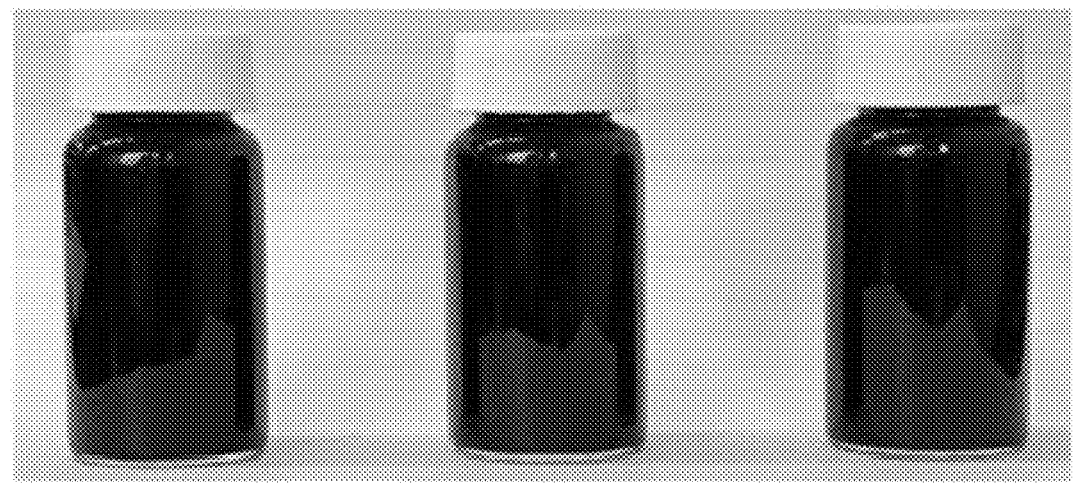
Figure 6:

Please refer to FIGS. 5 and 6, wherein FIG. 5 shows results of mixing biochars of Comparative Examples 1, 3, 4 and Examples 5, 6, 7 with water, and FIG. 6 shows results of mixing the biochars of Examples 5 to 13 with water. The biochars of Comparative Examples 1, 3, 4 and Examples 5 to 13 and water are put into glass jars, respectively. The glass jars are shaken for twice after being sealed, the mixing states of the biochars and the water are observed and recorded by photos. As shown in FIGS. 5 and 6, when no sodium percarbonate is added, the biochars of Comparative Examples 1, 3 and 4 are not hygroscopic and are suspended on the water surface. When 10 wt % of sodium percarbonate is added, the biochars of Examples 5 to 13 manufactured with different torrefaction temperatures (200° C. to 300° C.)

and torrefaction times (30 minutes to 90 minutes) all have hygroscopicity and can be dispersed in water.

The biochars of Comparative Example 1 and Example 14 are blended into EVA respectively to obtain composite materials of Comparative Example 5 and Example 18. The content of the biochar in each of the composite materials is 15 wt %. The method for manufacturing each of the composite materials is as follows: the EVA hot melt adhesive strip is cut into granules, the granules are placed in a stainless steel pot and the granules are heated and molten, the biochar is added therein and stirred evenly to form a mixture, then the mixture is cooled and solidified to obtain the composite material. The method for manufacturing an EVA substrate is as follows: the EVA hot melt adhesive strip is cut into granules, the granules is placed in a stainless steel pot and is heated and molten, and then the molten EVA is cooled and solidified to obtain the EVA substrate.

Figure 7:
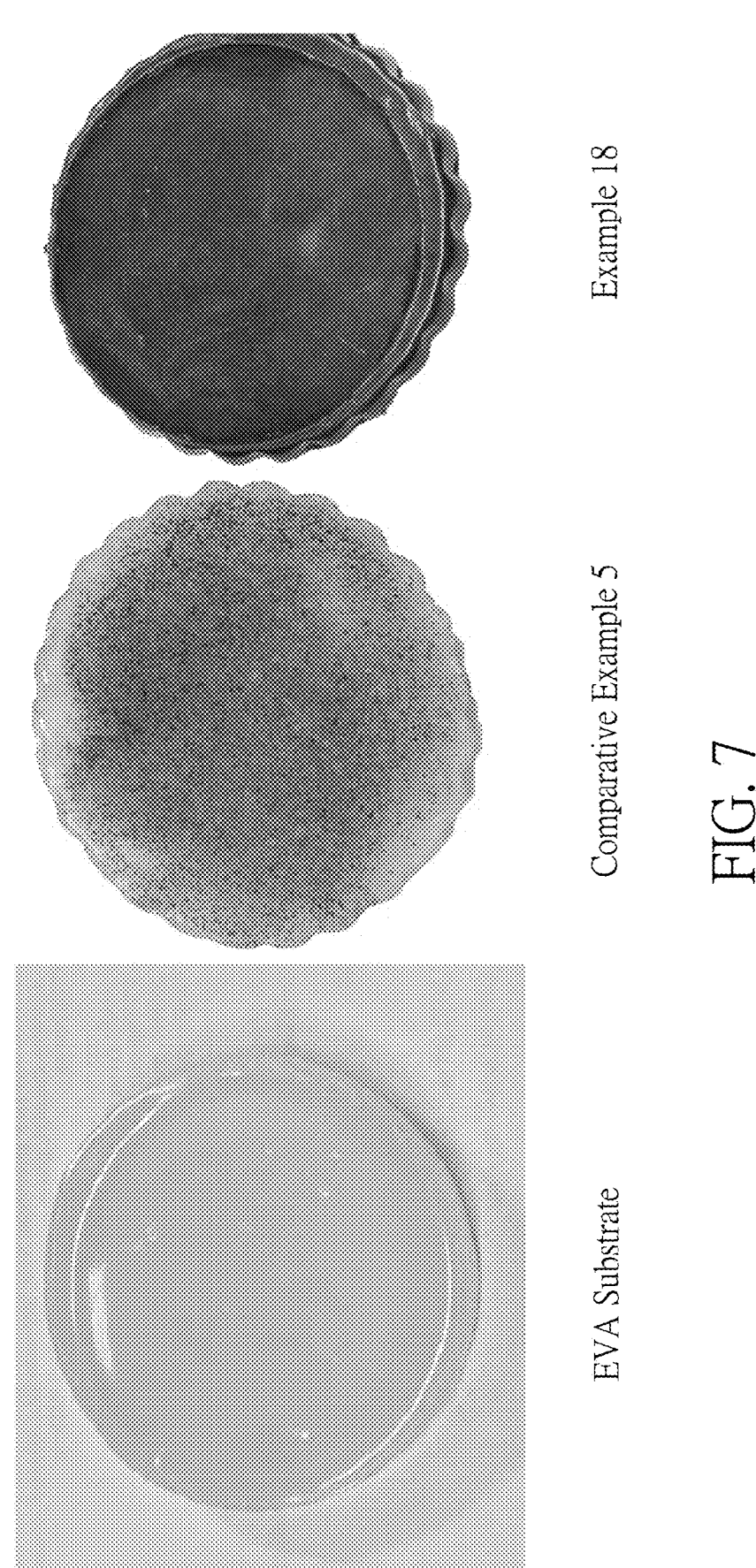
FIG. 7 shows appearances of an EVA substrate and composite materials of Comparative Example 5 and Example 18.

Please refer to FIG. 7, which shows appearances of the EVA substrate and the composite materials of Comparative Example 5 and Example 18. As shown in FIG. 7, the color of the EVA substrate which is not added with the biochar is close to white, and the addition of the biochar can color the EVA substrate. However, in the composite material of Comparative Example 5, the biochar cannot be dispersed in the EVA substrate evenly and the biochar in powder or granular form can be observed. On the contrary, in the composite material of Example 18, the biochar can be dispersed in the EVA substrate evenly, which provides the composite material a more uniform black color.

Figure 8:
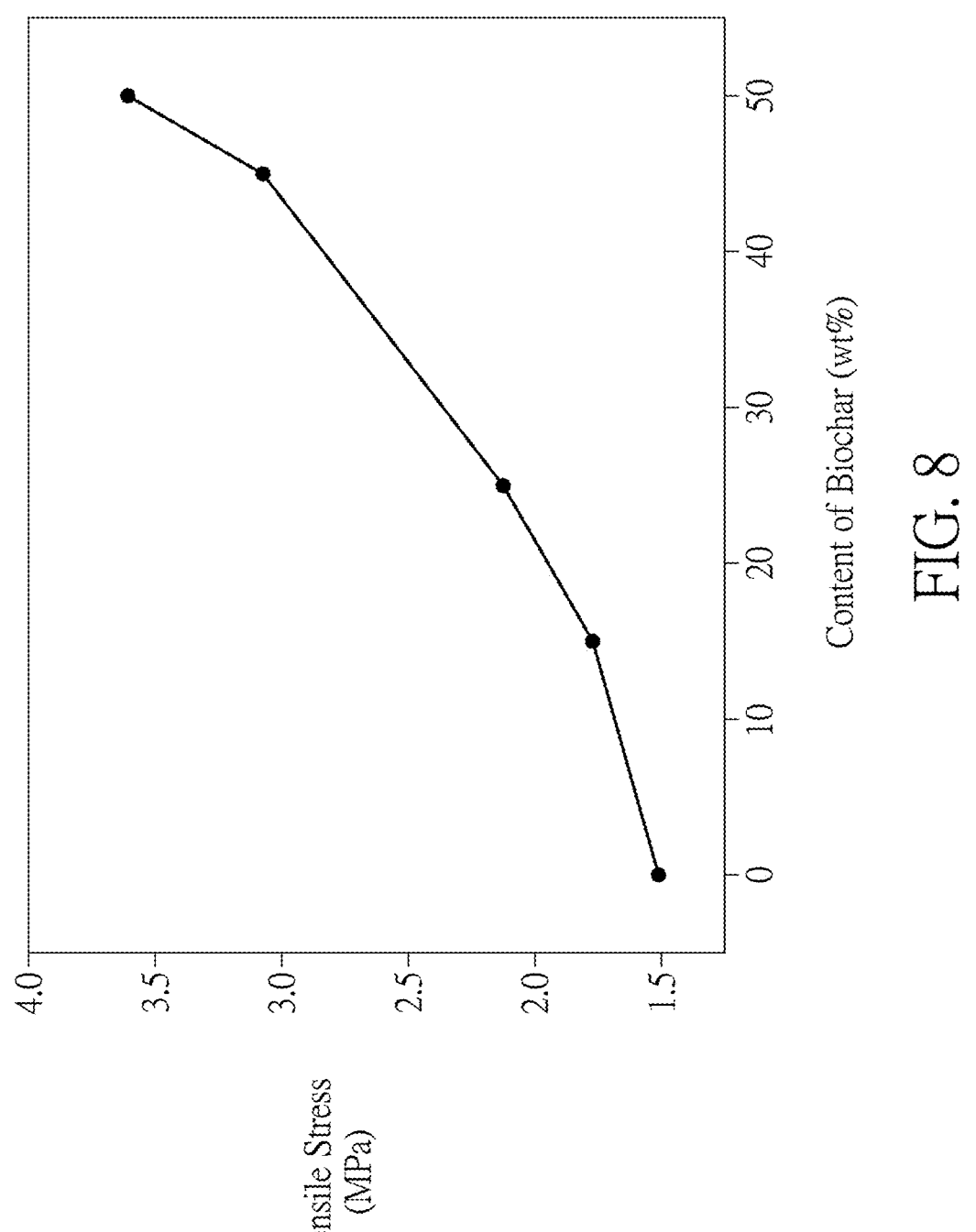
FIG. 8 shows a relationship of a tensile stress and a content of biochar of a composite material according to one embodiment of the present disclosure.

Please refer to FIG. 8, which shows a relationship of a tensile stress and a content of a biochar of a composite material according to one embodiment of the present disclosure. First, the EVA is added with different amounts of the biochar of Example 18 to obtain the composite materials with 15 wt %, 25 wt %, 45 wt %, and 50 wt % of the biochars, respectively. The aforementioned composite materials and the EVA substrate which is not added with the biochar are subjected to a tensile stress test according to ASTM D638, and the measured tensile stresses and the contents of the biochar are plotted to obtain FIG. 8. As shown in FIG. 8, by adding the biochar, when the content of the biochar is greater than 0 wt % and less than or equal to 50 wt %, it is beneficial to increase the tensile stress of the EVA substrate. In other words, it is beneficial to improve the mechanical property of composite material by adding the biochar.

0.5 gram (g) of the biochar of Example 15, 50 g of commercially available plaster, and 23 g of water are mixed and stirred evenly to obtain a composite material of Example 19. As shown in Table 5, by replacing the type and content of the biochar of Example 19, composite materials of Examples 20 to 22 can be obtained. The composite material of Comparative Example 6 can be obtained by replacing the biochar of Example 19 with a commercially available pigment, iron oxide black. The composite material of Comparative Example 7 can be obtained by replacing the biochar of Example 19 with a commercially available pigment, carbon black. The composite materials of Examples 19 to 22 and Comparative Examples 6 and 7 are mud-like coatings.

TABLE 5

| Example | 19 | 20 | 21 | 22 |
|---|---|---|---|---|
| Biochar | Example 15 | Example 16 | Example 16 | Example 17 |
| Content of biochar (g) | 0.5 | 1 | 05 | 0.5 |

Figure 9:
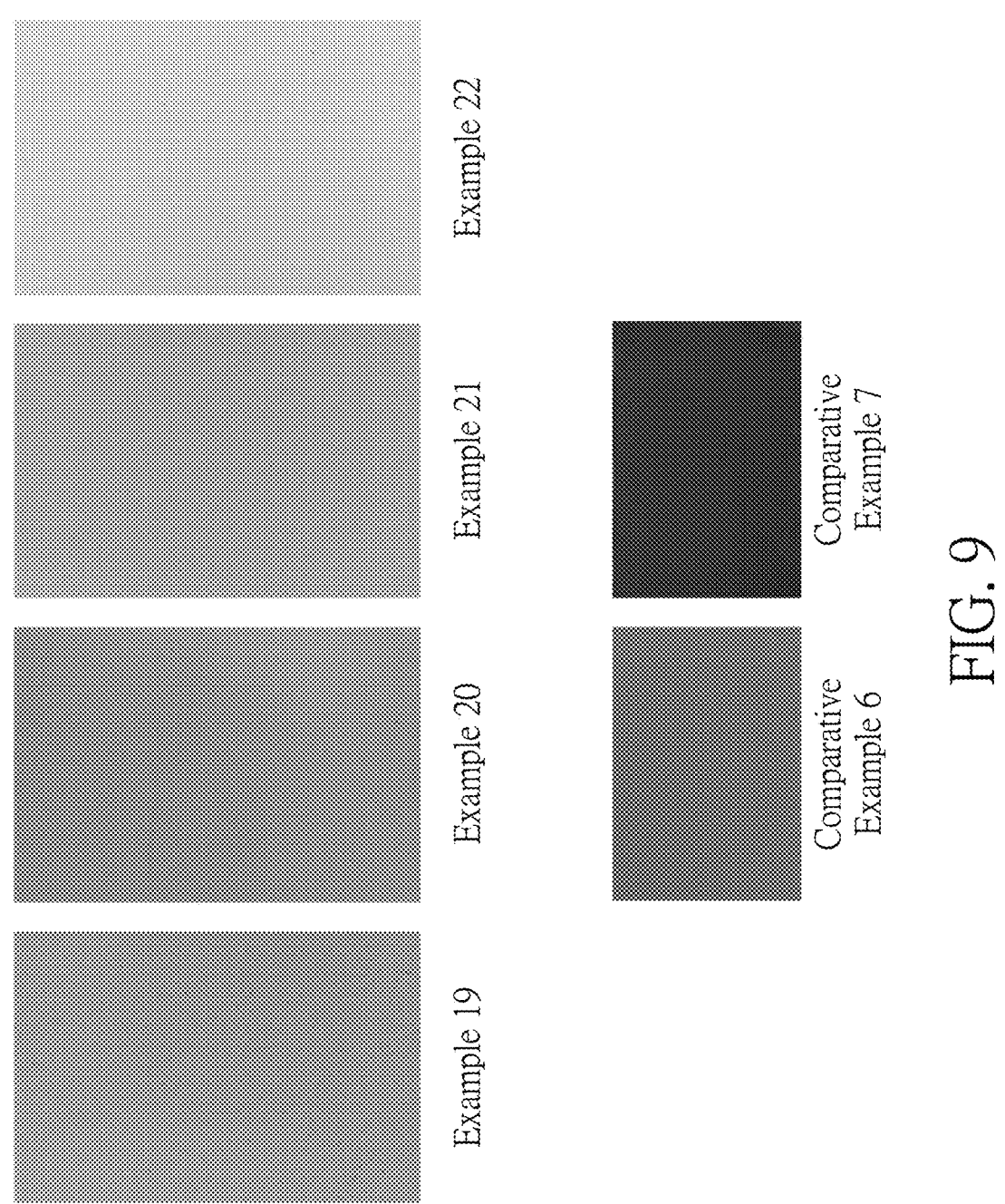
FIG. 9 shows coating results of composite materials of Examples 19 to 22 and Comparative Examples 6 and 7.

The composite materials of Examples 19 to 22 and Comparative Examples 6 and 7 are coated on a wooden board, and then dry the composite materials with a hair dryer and recorded by photos. Please refer to FIG. 9, which shows coating results of the composite materials of Examples 19 to 22 and Comparative Examples 6 and 7. As shown in FIG. 9, the biochar according to the present disclosure can be mixed evenly with the plaster, and can be used as a pigment in a mud-like coating. According to the coating made of the biochar according to the present disclosure, the color uniformity thereof is comparable to commercially available iron oxide black and carbon black. In addition, the coating can be featured with different colors depending on the type of the biomass that used to manufacture the biochar and the addition amount of the biochar.

Figure 10:
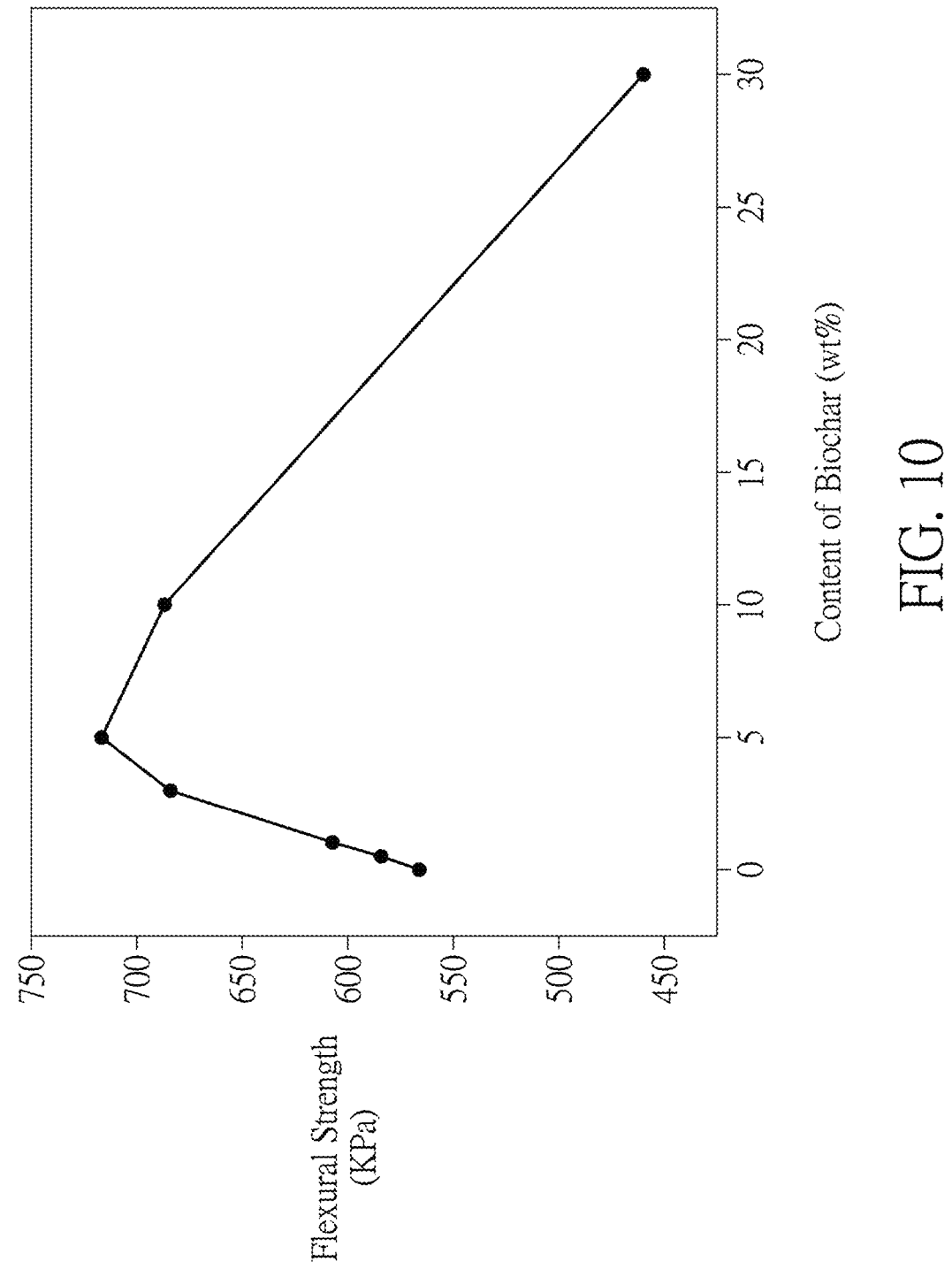
FIG. 10 shows a relationship of a flexural strength and a content of biochar of a composite material according to one embodiment of the present disclosure.

15 g of cement and 8 g of water are mixed and stirred evenly at room temperature to form a mixture, then leave the mixture to stand still and harden to obtain a cement base material, wherein a content of the biochar in the cement base material is 0 wt %. A part of the cement is replaced with different amounts of the biochar of Example 15, so that the total weight of cement and the biochar is maintained at 15 g, and the mixture of the cement and the biochar and 10 g of water are mixed and stirred evenly at room temperature, and then leave the mixture to stand still and harden to obtain composite materials with 0.5 wt %, 1 wt %, 4 wt %, 5 wt %, 10 wt % and 30 wt % of the biochars, respectively. The composite material and the cement base material that is not added with the biochar are subject to a flexural test according to ASTM D790. The measured flexural strengths and the contents of biochar are plotted to obtain FIG. 10. Please refer to FIG. 10, which shows a relationship of a flexural strength and a content of a biochar of a composite material according to one embodiment of the present disclosure. As shown in FIG. 10, by adding an appropriate amount of biochar, it is beneficial to improve the flexural strength of the composite material. In the embodiment, when the substrate is cement, and the contents of the biochar are 0.5 wt %, 1 wt %, 4 wt %, 5 wt % and 10 wt %, it is beneficial to improve the flexural strength of the composite material. However, when the content of the biochar is 30 wt %, the flexural strength of the composite material is reduced. Therefore, depending on the type of the substrate and the required properties of the composite material, the content of the biochar can be adjusted flexibly.

Compared with the prior art, the biomass treatment method according to the present disclosure can significantly reduce the probability of mold growth on the biomass by mixing the biomass with the sodium percarbonate, which is beneficial to improve the storage performance of the biomass. Compared with the conventional method of hot air drying, the biomass treatment method according to the present disclosure can reduce the treatment cost. According to the present disclosure, by torrefying the biomass and the sodium percarbonate together, the biochar obtained thereby is featured with excellent hygroscopicity, which is beneficial to manufacture different composite materials by mixing the biochar with other substrates. Accordingly, the application of the biochar can be broadened. In addition, the main component of the biochar is carbon. Using the biochar as a raw material of the composite material is beneficial for carbon capture and storage. When the biomass is a waste, it can further implement waste recycling.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A method for manufacturing a biochar, comprising:

providing a biomass and sodium percarbonate, wherein the biomass comprises hemicellulose, cellulose and/or lignin;

directly mixing the biomass and the sodium percarbonate without applying an elevated temperature to form a mixture; and directly torrefying the mixture of the biomass and the sodium percarbonate to convert the biomass into the biochar.

2. The method of claim 1, wherein the mixture of the biomass and the sodium percarbonate are torrefied at 200° C. to 300° C. for 30 minutes to 90 minutes in an oxygen-limited environment.

3. The method of claim 1, wherein based on 100 parts by weight of the mixture of the biomass and the sodium percarbonate, a content of the sodium percarbonate is 2 parts by weight to 90 parts by weight.

4. The method of claim 1, wherein a particle size of the biomass is greater than 0 mm and less than or equal to 5 mm.

* * * * *